US012196299B1

(12) United States Patent
McConnell et al.

(10) Patent No.: US 12,196,299 B1
(45) Date of Patent: Jan. 14, 2025

(54) TORQUE CONVERTER HAVING DAM AND COMPENSATION RESERVOIR

(71) Applicant: Schaeffler Technologies AG & Co. KG, Herzogenaurach (DE)

(72) Inventors: Trevor McConnell, Wooster, OH (US); Jeremy Jewell, Wooster, OH (US); Craig McBurney, Wooster, OH (US); Peter Rentfrow, Doylestown, OH (US)

(73) Assignee: Schaeffler Technologies AG &Co. KG, Herzogenaurach (DE)

( * ) Notice: Subject to any disclaimer, the term of this patent is extended or adjusted under 35 U.S.C. 154(b) by 0 days.

(21) Appl. No.: 18/216,977

(22) Filed: Jun. 30, 2023

(51) Int. Cl.
*F16H 45/02* (2006.01)

(52) U.S. Cl.
CPC ....... *F16H 45/02* (2013.01); *F16H 2045/021* (2013.01)

(58) Field of Classification Search
CPC .............. F16H 45/02; F16H 2045/021; F16H 2045/0294; F16H 2045/0215
See application file for complete search history.

(56) References Cited

U.S. PATENT DOCUMENTS

| | | | |
|---|---|---|---|
| 5,172,799 A | 12/1992 | Iijima et al. | |
| 7,004,039 B1 | 2/2006 | Ford et al. | |
| 9,810,302 B2 * | 11/2017 | Sayre | F16H 45/02 |
| 10,451,158 B2 * | 10/2019 | Vanni | F16H 45/02 |
| 11,402,005 B1 * | 8/2022 | Nelson | F16H 45/02 |
| 11,821,502 B1 * | 11/2023 | Garcia | F16H 45/02 |
| 2019/0323588 A1 | 10/2019 | Jo et al. | |
| 2021/0180670 A1 * | 6/2021 | Souers | F16H 45/02 |
| 2021/0254695 A1 * | 8/2021 | Norwich | F16H 45/02 |

FOREIGN PATENT DOCUMENTS

| | | | |
|---|---|---|---|
| DE | 10330031 A1 * | 1/2005 | ............ F16H 45/02 |
| DE | 102004027088 A1 | 1/2006 | |
| DE | 102006014737 A1 | 10/2007 | |

OTHER PUBLICATIONS

DE10330031A1 merged copy (Year: 2005).*

* cited by examiner

*Primary Examiner* — Courtney D Heinle (57) ABSTRACT

A torque converter includes a front cover, a shield, a lock-up clutch, and a dam. The front cover is arranged to receive a torque and includes a radial portion having an orifice extending axially therethrough. The shield is non-rotatably connected to the front cover and includes an opening extending axially therethrough. The shield and the front cover define a chamber. The lock-up clutch includes a piston. The piston and the front cover define in part a compensation chamber. The dam is arranged in the chamber and sub-divides the chamber into an air chamber and a compensation reservoir. At least a portion of the dam is axially displaceable within the chamber. The air chamber is arranged between the dam and the shield and is in fluid communication with an ambient environment via the opening. The compensation reservoir is arranged between the dam and the radial portion and is in fluid communication with the compensation chamber via the orifice.

20 Claims, 6 Drawing Sheets

TORQUE CONVERTER HAVING DAM AND COMPENSATION RESERVOIR

TECHNICAL FIELD

The present disclosure relates generally to torque converters and more specifically to torque converters having multiple flow passages to supply fluid to pressure chambers.

BACKGROUND

Many vehicles include a launch device between the engine and the transmission. A torque converter is a type of launch device commonly used in vehicles having an automatic transmission. A typical torque converter includes an impeller fixed to the crankshaft of the engine and a turbine fixed to a turbine shaft, which is the input to the transmission. To improve fuel economy, most torque converters include a bypass or lock-up clutch that mechanically couples the turbine shaft to a case of the torque converter to bypass the fluid coupling. It is known to provide flow paths for clutch apply and compensation pressure chambers, e.g., to hydraulically balance a piston. However, providing multiple flow paths may be expensive and add complexity to a torque converter design and/or a transmission design. Accordingly, it is desirable to provide alternative methods for providing pressurized chambers of a torque converter.

SUMMARY

Embodiments of this disclosure provide a torque converter including front cover, a shield, a lock-up clutch, and a dam. The front cover is arranged to receive a torque. The front cover includes a radial portion having an orifice extending axially therethrough. The shield is non-rotatably connected to the front cover and includes an opening extending axially therethrough. The shield and the front cover define a chamber. The lock-up clutch includes a piston. The piston and the front cover define in part a compensation chamber. The dam is arranged in the chamber and subdivides the chamber into an air chamber and a compensation reservoir. At least a portion of the dam is axially displaceable within the chamber. The air chamber is arranged between the dam and the shield. The air chamber is in fluid communication with an ambient environment via the opening. The compensation reservoir is arranged between the dam and the radial portion. The compensation reservoir is in fluid communication with the compensation chamber via the orifice.

In embodiments, pressurized fluid may be sealed in the compensation chamber and the compensation reservoir. In embodiments, the orifice may be arranged radially inside of the piston. In embodiments, the opening may be configured to permit air flow out of the air chamber during axial displacement of the portion of the dam away from the radial portion. The opening may be configured to permit air flow into the air chamber during axial displacement of the portion of the dam towards the radial portion. In embodiments, the compensation reservoir may be sealed from the air chamber.

In embodiments, for a lock-up mode, the piston may be non-rotatably connected to the front cover and pressurized fluid may be arranged to flow through the orifice into the compensation reservoir to displace the portion of the dam in an axial direction away from the radial portion. For the lock-up mode, the air chamber may be configured to arranged to permit air flow from the air chamber via the opening.

In embodiments, for a torque converter mode, pressurized fluid may be arranged to flow through the orifice into the compensation chamber to displace the piston in an axial direction away from the radial portion to disconnect the piston from the front cover. For the torque converter mode, the air chamber may be arranged to permit air flow into the air chamber via the opening.

In embodiments, the orifice may be arranged radially inside of the opening. In embodiments, the front cover may be arranged axially between the shield and the lock-up clutch.

In embodiments, the dam may be a diaphragm. Ends of the dam may be axially compressed between the front cover and the shield.

In embodiments, the dam may be a plate. An inner diameter of the dam may be sealed to the shield and an outer diameter of the dam is sealed to the front cover.

In embodiments, the lock-up clutch may further include a seal plate sealed to the piston. The piston may be disposed axially between the shield and the seal plate. The piston and the seal plate may define in part an apply chamber. The apply chamber may be sealed from the compensation chamber. The seal plate may be arranged to non-rotatably connect to a transmission input shaft.

In embodiments, the torque converter may include an impeller non-rotatably connected to the front cover. The front cover may be arranged axially between the shield and the impeller.

Embodiments disclosed herein provide the advantageous benefit of reduced costs and complexity of torque converters having apply and compensation pressure chambers, for example, by removing a flow path for directing flow to the compensation pressure chamber. Furthermore, embodiments disclosed herein offer design advantages by providing pressurized chambers that hydraulically balance a piston without creating a cross-flow configuration with additional components or costly manufacturing operations.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Referring to FIGS. 1A-3B, a portion of a torque converter 100 is illustrated according to exemplary embodiments of the present disclosure. At least some portions of the torque converter 100 are rotatable about a central axis A. While only a portion of the torque converter 100 above the central axis A is shown in FIGS. 1A-3B, it should be understood that the torque converter 100 can appear substantially similar below the central axis A with many components extending about the central axis A. Words such as "axial," "radial," "circumferential," "outward," etc. as used herein are intended to be with respect to the central axis A.

The torque converter 100 includes: a front cover 102 arranged to receive torque; an impeller 104; a turbine 106; a lock-up clutch 108; a shield 110, and a dam 134. The impeller 104 includes: an impeller shell 112 non-rotatably connected to the front cover 102 such that the impeller 104 rotates as the front cover 102 rotates, at least one impeller blade 114 attached to an inner surface of the impeller shell 112, and an impeller hub 116 attached to a radially inner end of the impeller shell 112. The turbine 106 includes a turbine shell 118 and at least one turbine blade 120 attached to the turbine shell 118. By "non-rotatably connected" components, we mean that: the components are connected so that whenever one of the components rotate, all the components rotate; and relative rotation between the components is not possible. Radial and/or axial movement of non-rotatably connected components with respect to each other is possible, but not required.

The torque converter 100 may include a stator 138 disposed axially between the impeller 104 and the turbine 106 to redirect fluid flowing from the turbine blade 120 before the fluid reaches the impeller 104 to increase an efficiency of the torque converter 100. For example, the impeller blade 114, when rotated about the central axis A, pushes the fluid outwardly. The fluid pushes against the turbine 106 of the torque converter 100, causing the turbine 106 to revolve about the central axis A. The stator 138 functions to return the fluid from the turbine 106 back to the impeller 104 with minimal or no power loss. Drive power is transmitted from the turbine 106 to a transmission input shaft 136.

The torque converter 100 may include a damper assembly 140. The damper assembly 140 may be positioned axially between the front cover 102 and the impeller shell 112 and may be configured for transferring torque from the front cover 102 to the transmission input shaft 136. The damper assembly 140 may include a spring 142 and a spring retainer 144. The spring 142 may be drivingly engaged with the lock-up clutch 108. The spring retainer 144 may support the spring 142 and may be fixed to the turbine shell 118.

Power from the vehicle engine can be transmitted to a transmission (not shown) via fluid, and via the torque converter 100. In particular, the power may be transmitted to the front cover 102. The lock-up clutch 108 is configured to selectively transfer torque from the front cover 102 to the transmission input shaft 136. The lock-up clutch 108 includes a piston 146, a clutch plate 148, and a seal plate 150.

The clutch plate 148 is disposed between the front cover 102 and the piston 146. The clutch plate 148 may be configured to engage the spring 142 of the damper assembly 140. That is, the clutch plate 148 may transfer torque from the front cover 102 to the damper assembly 140. Friction material or facing (not numbered) may be disposed between and affixed to one of the front cover 102 or the clutch plate 148; and friction material or facing may be disposed and affixed to one of the clutch plate 148 or the piston 146. Friction material may include grooves for cooling flow therethrough.

The piston 146 may be arranged to non-rotatably connect to the transmission input shaft 136. For example, the piston 146 may be sealed, e.g., at the inner diameter thereof, to a hub 37 that is non-rotatably connected to the transmission input shaft 136, e.g., via a splined connection. The piston 146 may be sealed to the hub 137 via a seal 152. The piston 146 may be sealed to the front cover 102 via a seal 154. The piston 146 may further be connected to the seal plate 150 via a leaf-spring connection that allows axial displacement of the piston 146 in first axial direction AD1 and second axial direction AD2 for selective engagement of lock-up clutch 108.

The seal plate 150 is sealed at an outer diameter thereof to the piston 146 via a seal 156. The seal plate 150 may be fixed at an inner diameter thereof to the hub 137, e.g., via staking. The seal plate 150 may be sealed to the hub 137, e.g., at the staking.

The torque converter 100 includes an apply chamber 158. The apply chamber 158 is bounded, at least in part, by the seal plate 150, the seal 156, the piston 146, the seal 152, and the hub 137. The piston 146 engages or closes the lock-up clutch 108 in response to the pressurization of a medium (e.g., fluid such as oil) in the apply chamber 158, e.g., by axially displacing the piston 146 towards the front cover 102. The seals 152, 156 maintain a fluid separation between apply chamber 158 and the rest of the torque converter 100. By "bounded in part," we mean that a portion of the cited chamber, flow path, or other structure is bounded, or formed, by the cited element.

The torque converter 100 further includes a compensation chamber 160. The compensation chamber 160 may assist in hydraulically balancing the piston 146. By hydraulically balancing the piston 146, we mean that compensation chamber 160 and the apply chamber 158 are both filled with fluid, e.g., oil, so that any dynamic pressure effects from rotation of the piston 146, the shield 110, the shaft 136, etc. are then compensated, improving controllability of the piston 146 during clutch engagement events. The compensation chamber 160 is bounded, at least in part, by the front cover 102, the hub 137, the seal 152, the piston 146, and the seal 154.

The front cover 102 includes an axial portion 122 radially spaced from the central axis A and extending along the central axis A. The front cover 102 further includes a transition portion 124 arranged radially inside of the axial portion 122. The transition portion 124 may extend oblique to the central axis A. The front cover 102 further includes a radial portion 126 extending radially inward from the axial portion 122 to the transition portion 124. The radial portion 126 extends transverse to the axial portion 122 and the transition portion 124. The front cover 102 further includes an inner radial portion 128 extending radially inward from the transition portion 124, and an outer radial portion 130 extending radially outward from the axial portion 122. The inner radial portion 128, e.g., at a radial inner end thereof, may be non-rotatably connected to the hub 137, e.g., via a weld. The inner radial portion 128 includes an orifice 132 extending axially therethrough. The orifice 132 may be arranged radially inside of the piston 146.

The shield 110 is non-rotatably connected to the front cover 102. A radially inner end of the shield 110 may, for example, be non-rotatably connected to the inner radial portion 128 of the front cover 102, e.g., via a weld. Additionally, or alternatively, the radially inner end of the shield 110 may be non-rotatably connected to the hub 137. For example, the radially inner end of the shield 110, the inner radial portion 128, and the hub 137 may be non-rotatably connected to each other via a weld. A radially outer end of the shield 110 may be non-rotatably connected to the radial portion 126 of the front cover 102, e.g., via a weld. The front cover 102 is arranged between the shield 110 and the impeller 104.

The shield 110 includes one or more openings 162. The opening(s) 162 extend axially through the shield 110. In an example in which the shield 110 includes a plurality of openings 162, the openings 162 may be spaced from each other in any suitable arrangement. For example, the openings 162 may be spaced from each other uniformly, e.g., circumferentially, or about the central axis A. As another example, the openings 162 may be spaced from each other non-uniformly about the central axis A. As yet another example, the openings 162 may be spaced from each other, e.g., uniformly or non-uniformly, in a direction transverse to the central axis A. In an example in which the shield 110 includes one opening 162, the opening 162 may have any suitable size and shape, e.g., circular rectangular, etc. Additionally, the opening 162 may be centered on, i.e., extend about, or offset from the central axis A.

The shield 110 and the front cover 102 define a chamber 164 therebetween. The dam 134 is arranged in the chamber 164. The dam 134 sub-divides the chamber 164 into an air chamber 164a and a compensation reservoir 164b. The dam 134 is configured to permit expansion and contraction of the compensation reservoir 164b relative to the air chamber 164a during operation of the lock-up clutch 108. That is, at least a portion of the dam 134 axially displaces within the chamber 164, e.g., in the first axial direction AD1 or the second axial direction AD2, during operation of the lock-up clutch 108.

Figure 1A:
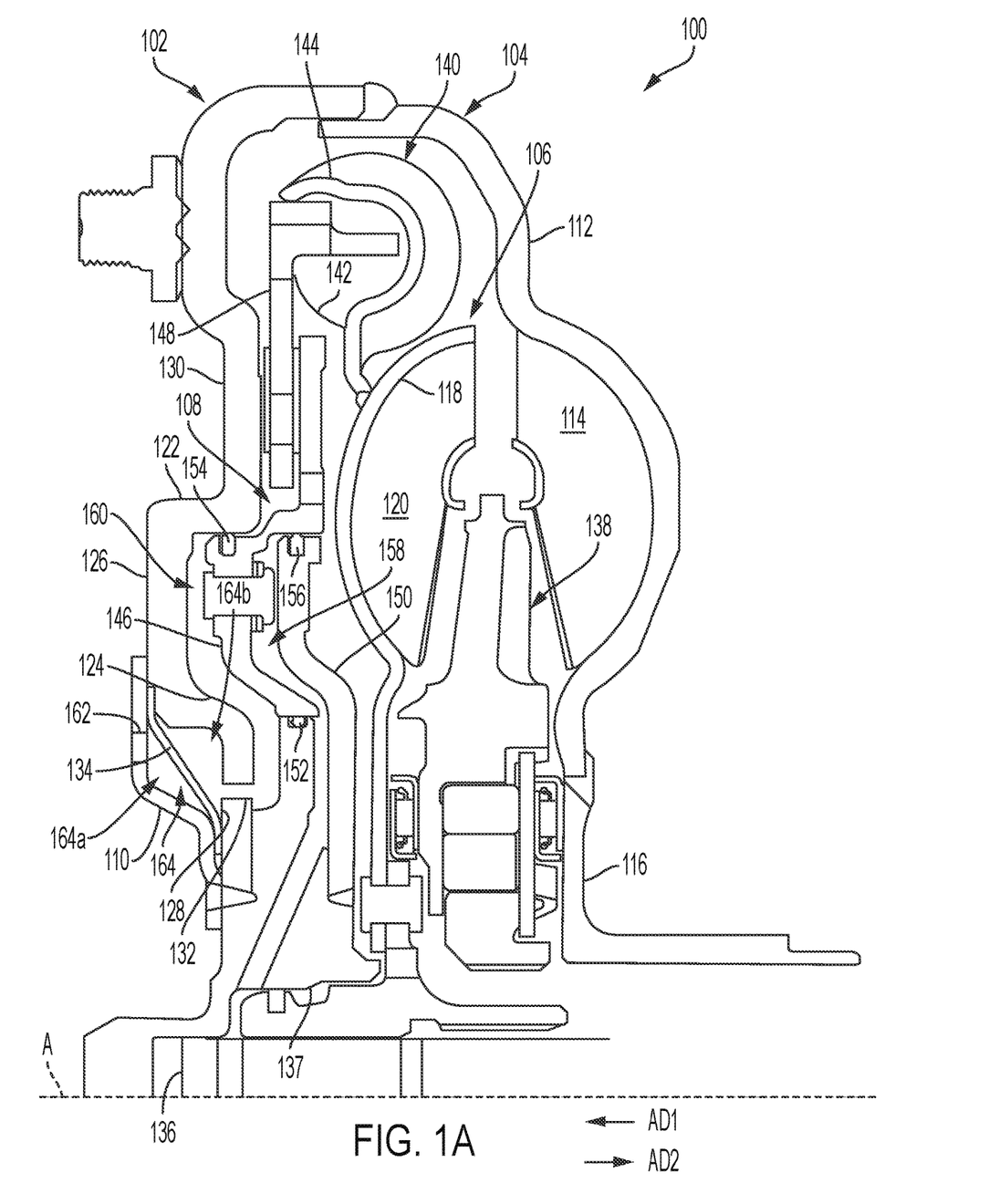
FIG. 1A illustrates a cross-sectional view of a torque converter in a torque converter mode according to one exemplary embodiment of the present disclosure.
Figure 1B:
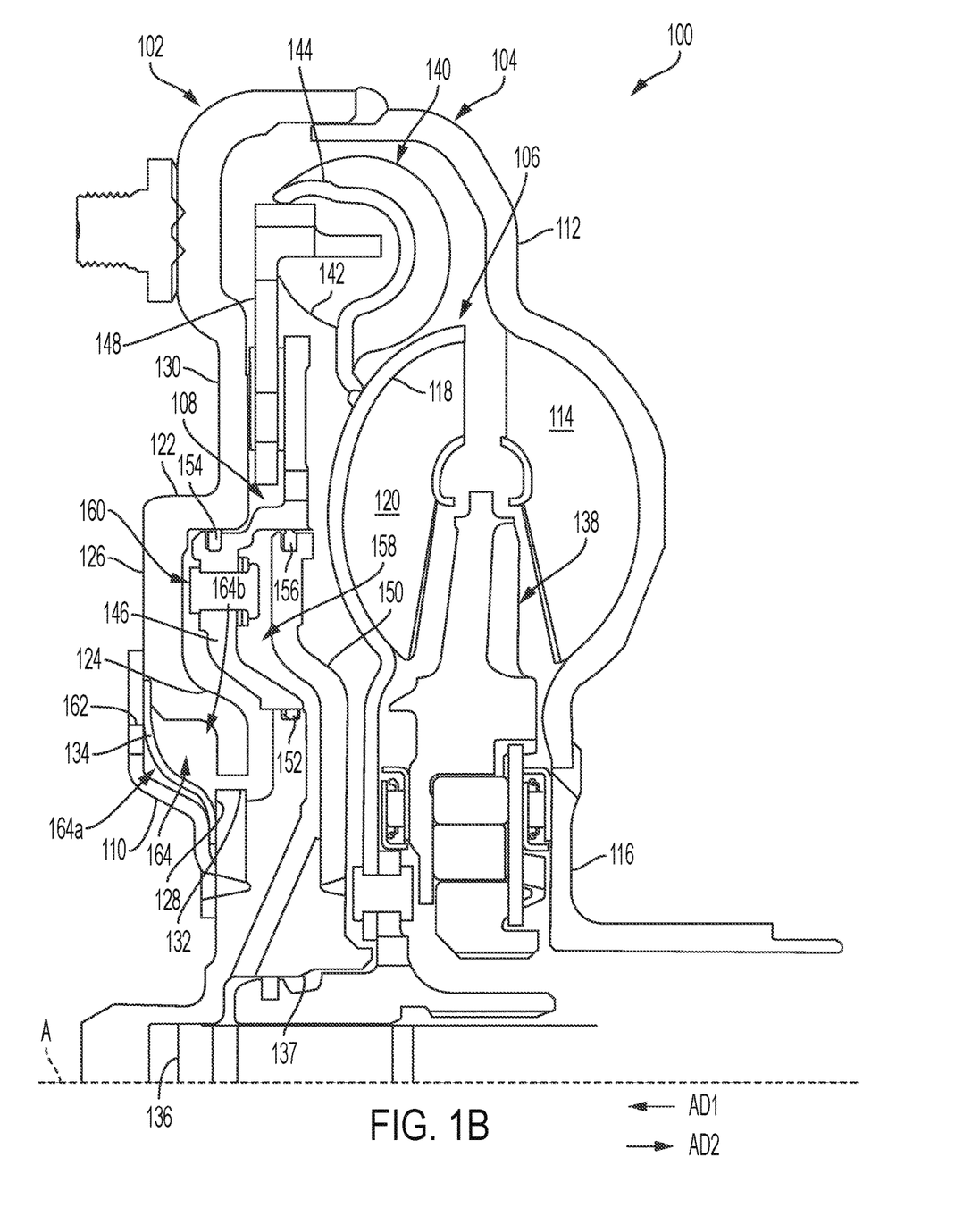
FIG. 1B illustrates the cross-sectional view of the torque converter shown in FIGS. 1A and 1n a lock-up mode.
Figure 2A:
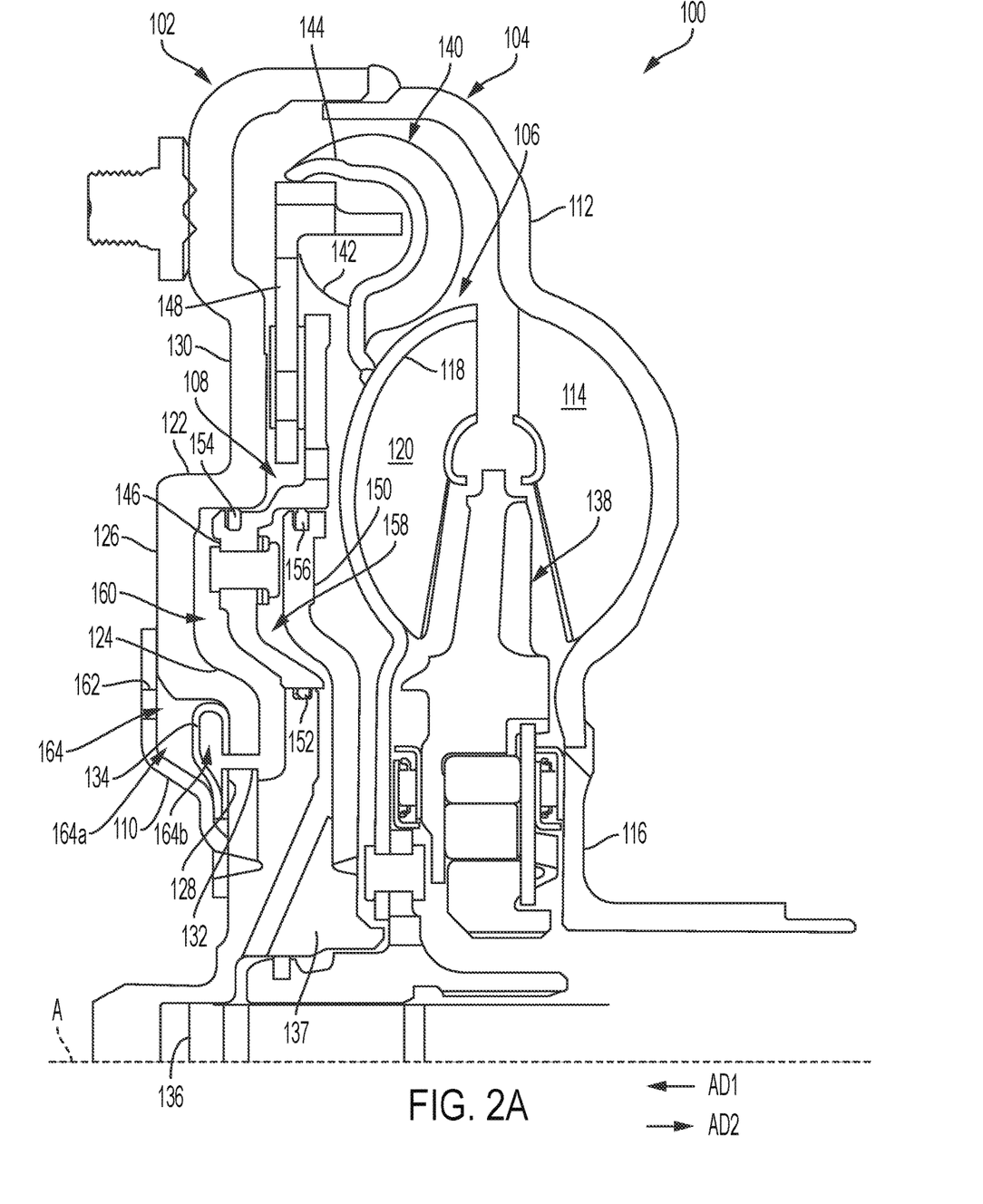
FIG. 2A illustrates a cross-sectional view of a torque converter in the torque converter mode according to another exemplary embodiment of the present disclosure.
Figure 2B:
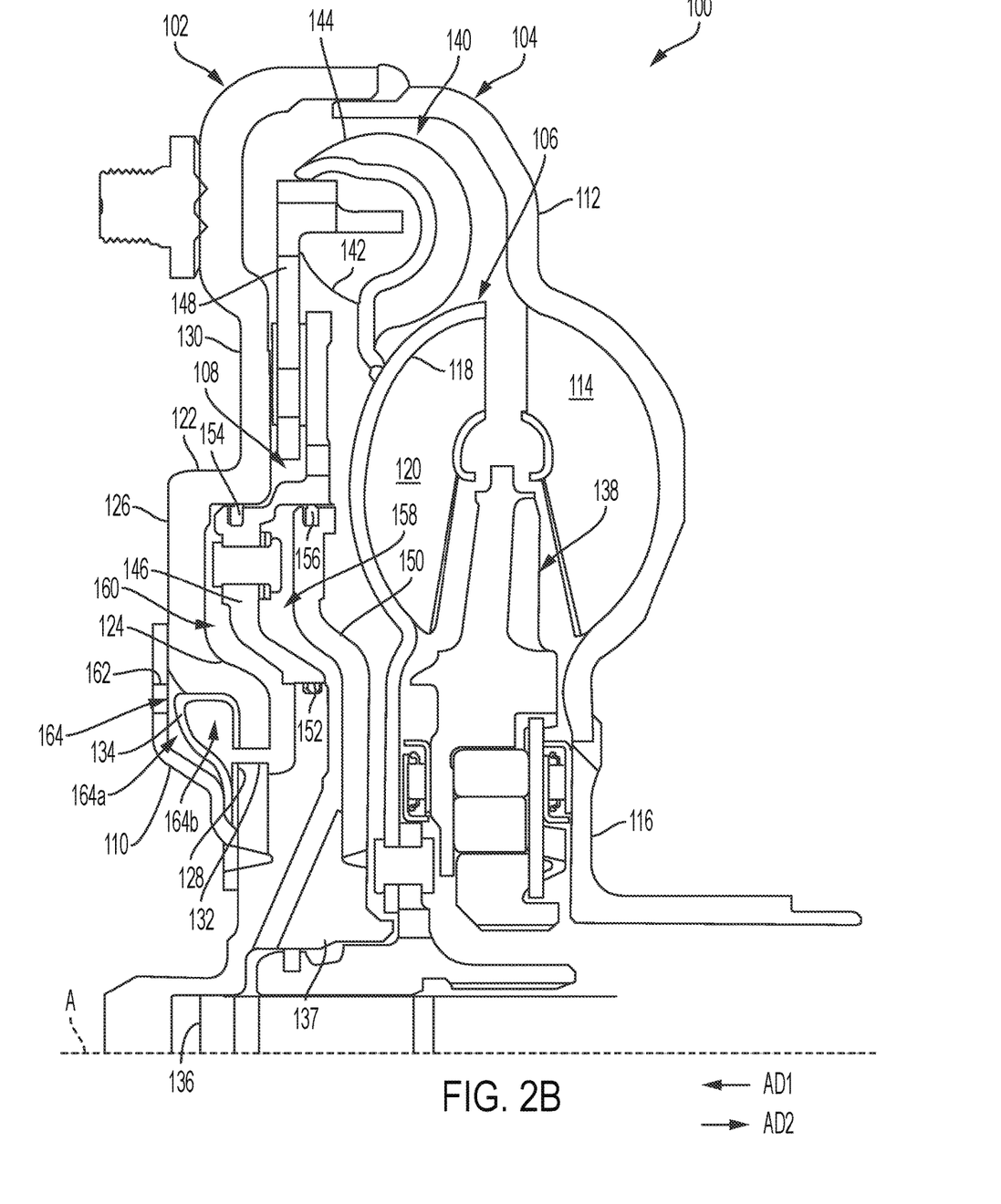
FIG. 2B illustrates the cross-sectional view of the torque converter shown in FIG. 2A and in the lock-up mode.

In one exemplary embodiment, the dam 134 is a diaphragm, e.g., formed of a polymer such as rubber, configured to elastically deform during operation of the lock-up clutch 108. In such an example, a portion of the dam 134 arranged between ends (not numbered) thereof may be axially displaceable during operation of the lock-up clutch 108. As one example, one end of the dam 134 is compressed between the shield 110 and the inner radial portion 128 radially inside of the orifice 132, and the other end of the dam 134 is compressed between the shield 110 and the radial portion 126 radially outside of the opening(s) 162, as shown in FIGS. 1A-1B. As another example, the ends of the dam 134 are each compressed between the shield 110 and the inner radial portion 128 radially inside of the orifice 132, as shown in FIGS. 2A-2B. In such an example, the dam 134 may include a hole (not numbered) axially aligned with the orifice 132 and arranged to permit fluid communication between the compensation chamber 160 and the compensation reservoir 164b. The dam 134 may be connected to the inner radial portion 128 around the orifice 132, e.g., via adhesive, to maintain alignment of the hole and the orifice 132 during operation of the lock-up clutch 108.

Figure 3A:
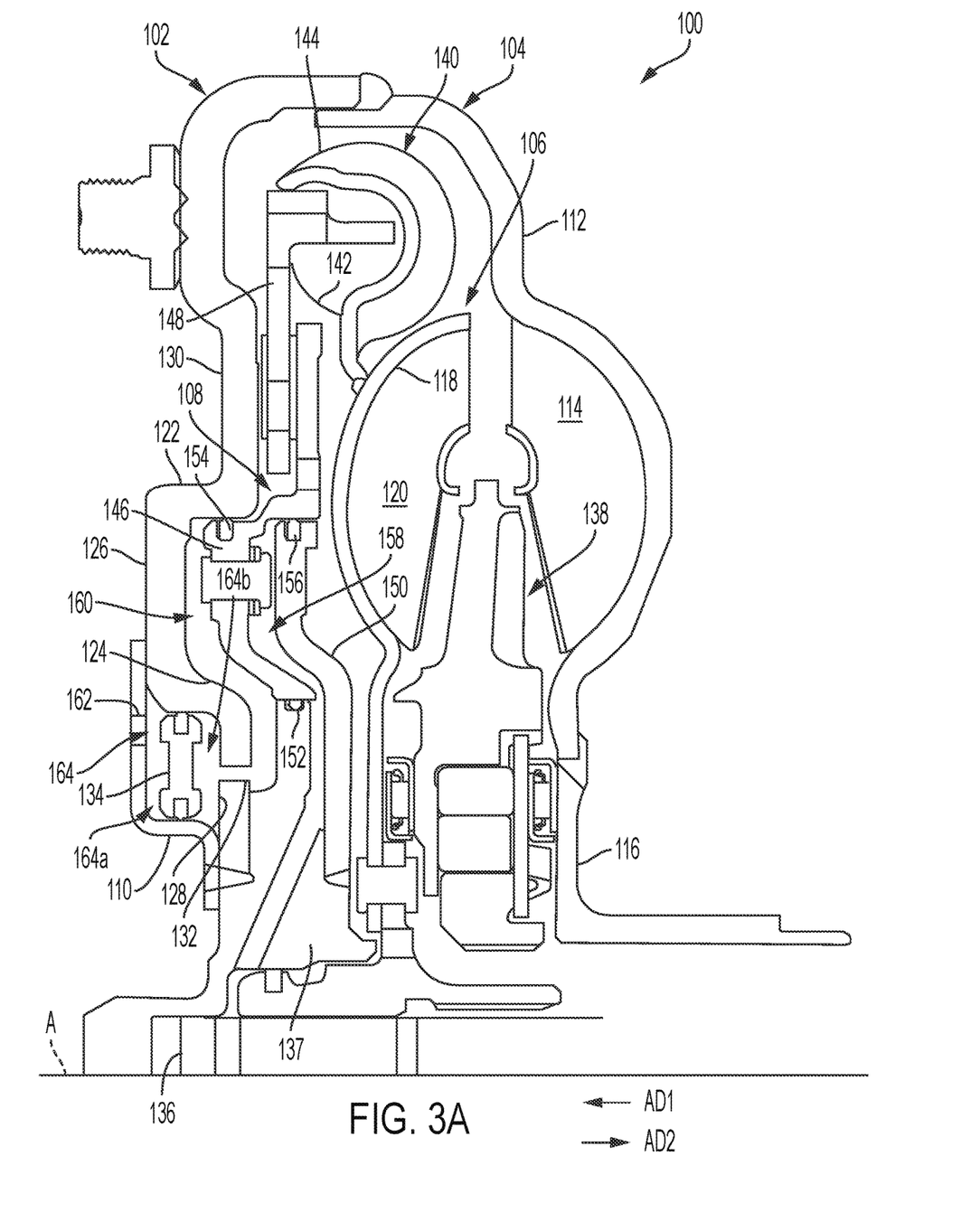
FIG. 3A illustrates a cross-sectional view of a torque converter in the torque converter mode according to another exemplary embodiment of the present disclosure.
Figure 3B:
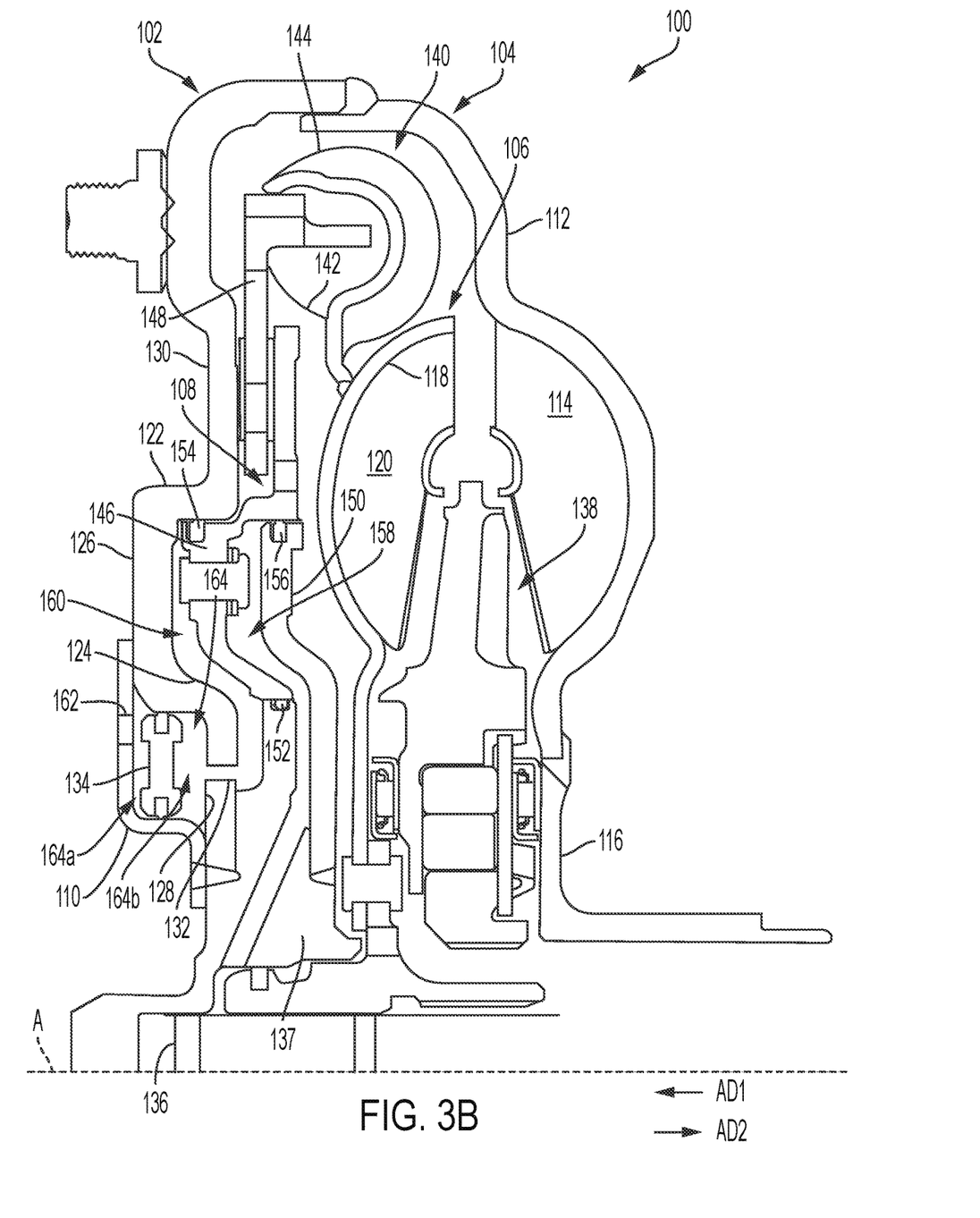
FIG. 3B illustrates the cross-sectional view of the torque converter shown in FIG. 3A and in the lock-up mode.

In another exemplary embodiment, the dam 134 is a plate, e.g., formed of metal, configured to axially displace during operation of the lock-up clutch 108. In such an example, the entire dam 134 is arranged to axially displace during operation of the lock-up clutch 108, as shown in FIGS. 3A-3B. Further, the dam 134 is sealed, at an outer diameter thereof, to the axial portion 122, e.g., via a seal (not numbered), and, at an inner diameter thereof, to the shield 110, e.g., via a seal (not numbered).

The dam 134, e.g., via compression between the front cover 102 and the shield 110 (as shown in FIGS. 1A-2B) or via the seals (as shown in FIGS. 3A-3B), maintains fluid separation between the compensation chamber 160 and the air chamber 164a.

The compensation reservoir 164b is arranged between the dam 134 and the front cover 102. The compensation reservoir 164b is in fluid communication with the compensation chamber 160 via the orifice 132. The compensation chamber 160 and the compensation reservoir 164b are pre-filled with fluid. That is, during assembly of the torque converter 100, the dam 134 is sealed between the air chamber 164a and the compensation reservoir 164b. Then, prior to the piston 146 being sealed to the hub 137 and the front cover 102, fluid is provided to the compensation chamber 160 and the compensation reservoir 164b. Fluid sealed in the compensation chamber 160 and compensation reservoir 164b can flow between the compensation chamber 160 and compensation reservoir 164b via the orifice 132. Respective volumes of fluid in the compensation chamber 160 and compensation reservoir 164b may change based on an operation mode of the torque converter 100, as discussed further below.

The air chamber 164a is arranged between the shield 110 and the dam 134. The air chamber 164a is in fluid communication with an ambient environment around the torque converter 100 via the opening(s) 162. Being in fluid communication with the ambient environment allows the air chamber 164a to assist in axial displacement of the dam 134. For example, during engagement of the piston 146, fluid is compressed by the piston 146 against the front cover 102, which directs the fluid through the orifice 132 in the first axial direction AD1. In this situation, the fluid applies a force on the dam 134. Since an air pressure, e.g., 0 bar, in the air chamber 164a is less than a pressure of the fluid acting on the dam 134, the air chamber 164a permits the dam 134 to displace in the first axial direction AD1. Similarly, during disengagement of the piston 146, the air pressure, e.g., 0 bar, in the air chamber 164a is greater than the pressure of the fluid acting on the dam 134. In this situation, the air pressure applies a force on the dam 134, which compresses the dam 134 and directs the fluid through the orifice 132 in the second axial direction AD2.

For a lock-up mode for the torque converter 100, in which the piston 146 is non-rotatably connected to the front cover 102 and the torque is transmitted to the transmission input shaft 136 through the lock-up clutch 108, pressurized fluid is arranged to flow from the transmission input shaft 136 into the apply chamber 158 to displace the piston 146 in the first axial direction AD1 to connect the piston 146 with the front cover 102 bypassing the hydrodynamic fluid coupling. During engagement of the piston 146, fluid passes through the orifice 132 from the compensation chamber 160 to the compensation reservoir 164b. In this situation, at least a portion of the dam 134 displaces in the first axial direction AD1, as discussed above, which increases the volume of the fluid in the compensation reservoir 164b and correspondingly decreases the volume of the fluid in the compensation chamber 160. In this situation, a volume of the air chamber 164a is decreased in response to axial displacement of the dam 134 in the first axial direction AD1.

For a torque converter mode for the torque converter 100, in which the front cover 102 is rotatable with respect to the piston 146 and the torque bypasses the lock-up clutch 108, pressurized fluid is arranged to flow through the flow path 184 out of the apply chamber 158 to displace the piston 146 in the second axial direction AD2, opposite direction AD1, to disconnect the piston 146 from the front cover 102. During disengagement of the piston 146, fluid passes through the orifice 132 from the compensation reservoir 164b to the compensation chamber 160. In this situation, the dam 134 displaces in the second axial direction AD2, as discussed above, which decreases the volume of the fluid in the compensation reservoir 164b and correspondingly increases the volume of the fluid in the compensation chamber 160. In this situation, a volume of the air chamber 164a is increased in response to axial displacement of the dam 134 in the second axial direction AD2.

Embodiments according to the present disclosure provide various advantages including cost reductions by providing pressurized chambers that hydraulically balance a piston without creating a cross-flow configuration with additional components or costly manufacturing operations.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 100 torque converter
102 front cover
104 impeller
106 turbine
108 lock-up clutch
110 shield
112 impeller shell
114 impeller blade
116 impeller hub
118 turbine shell
120 turbine blade
122 axial portion
124 transition portion
126 radial portion
128 inner radial portion
130 outer radial portion
132 orifice
134 dam
136 transmission input shaft
137 hub
138 stator
140 damper assembly
142 spring
144 retainer
146 piston
148 clutch plate
150 seal plate
152 seal
154 seal
156 seal
158 apply chamber
160 compensation chamber
162 opening
164 chamber
164a air chamber
164b compensation reservoir
A central axis
AD1 axial direction
AD2 axial direction

What is claimed is:

1. A torque converter, comprising:
a front cover arranged to receive a torque, the front cover including a radial portion having an orifice extending axially therethrough;
a shield non-rotatably connected to the front cover and including an opening extending axially therethrough, the shield and the front cover defining a chamber;
a lock-up clutch including a piston, the piston and the front cover defining in part a compensation chamber; and
a dam arranged in the chamber and sub-dividing the chamber into an air chamber and a compensation reservoir, at least a portion of the dam being axially displaceable within the chamber;
wherein the air chamber is arranged between the dam and the shield, the air chamber being in fluid communication with an ambient environment via the opening;
wherein the compensation reservoir is arranged between the dam and the radial portion, the compensation reservoir being in fluid communication with the compensation chamber via the orifice.

2. The torque converter of claim 1, wherein pressurized fluid is sealed in the compensation chamber and the compensation reservoir.

3. The torque converter of claim 1, wherein the orifice is arranged radially inside of the piston.

4. The torque converter of claim 1, wherein the opening is configured to permit air to flow out of the air chamber during axial displacement of the portion of the dam away from the radial portion.

5. The torque converter of claim 4, wherein the opening is configured to permit the air to flow into the air chamber during axial displacement of the portion of the dam towards the radial portion.

6. The torque converter of claim 1, wherein the compensation reservoir is sealed from the air chamber.

7. The torque converter of claim 1, wherein, for a lock-up mode, the piston is non-rotatably connected to the front cover and pressurized fluid is arranged to flow through the orifice into the compensation reservoir to displace the portion of the dam in an axial direction away from the radial portion.

8. The torque converter of claim 7, wherein, for the lock-up mode, the air chamber is configured to arranged to permit air flow from the air chamber via the opening.

9. The torque converter of claim 1, wherein, for a torque converter mode, pressurized fluid is arranged to flow through the orifice into the compensation chamber to displace the piston in an axial direction away from the radial portion to disconnect the piston from the front cover.

10. The torque converter of claim 9, wherein, for the torque converter mode, the air chamber is arranged to permit air flow into the air chamber via the opening.

11. The torque converter of claim 1, wherein the orifice is arranged radially inside of the opening.

12. The torque converter of claim 1, wherein the front cover is arranged axially between the shield and the lock-up clutch.

13. The torque converter of claim 1, wherein the dam is a diaphragm.

14. The torque converter of claim 13, wherein ends of the dam are axially compressed between the front cover and the shield.

15. The torque converter of claim 1, wherein the dam is a plate.

16. The torque converter of claim 15, wherein an inner diameter of the dam is sealed to the shield and an outer diameter of the dam is sealed to the front cover.

17. The torque converter of claim 1, wherein the lock-up clutch further includes a seal plate sealed to the piston, the piston being disposed axially between the shield and the seal plate.

18. The torque converter of claim 17, wherein the piston and the seal plate define in part an apply chamber, the apply chamber being sealed from the compensation chamber.

19. The torque converter of claim 17, wherein the seal plate is arranged to non-rotatably connect to a transmission input shaft.

20. The torque converter of claim 1, further comprising an impeller non-rotatably connected to the front cover, the front cover being arranged axially between the shield and the impeller.

* * * * *